Patented Apr. 27, 1926.

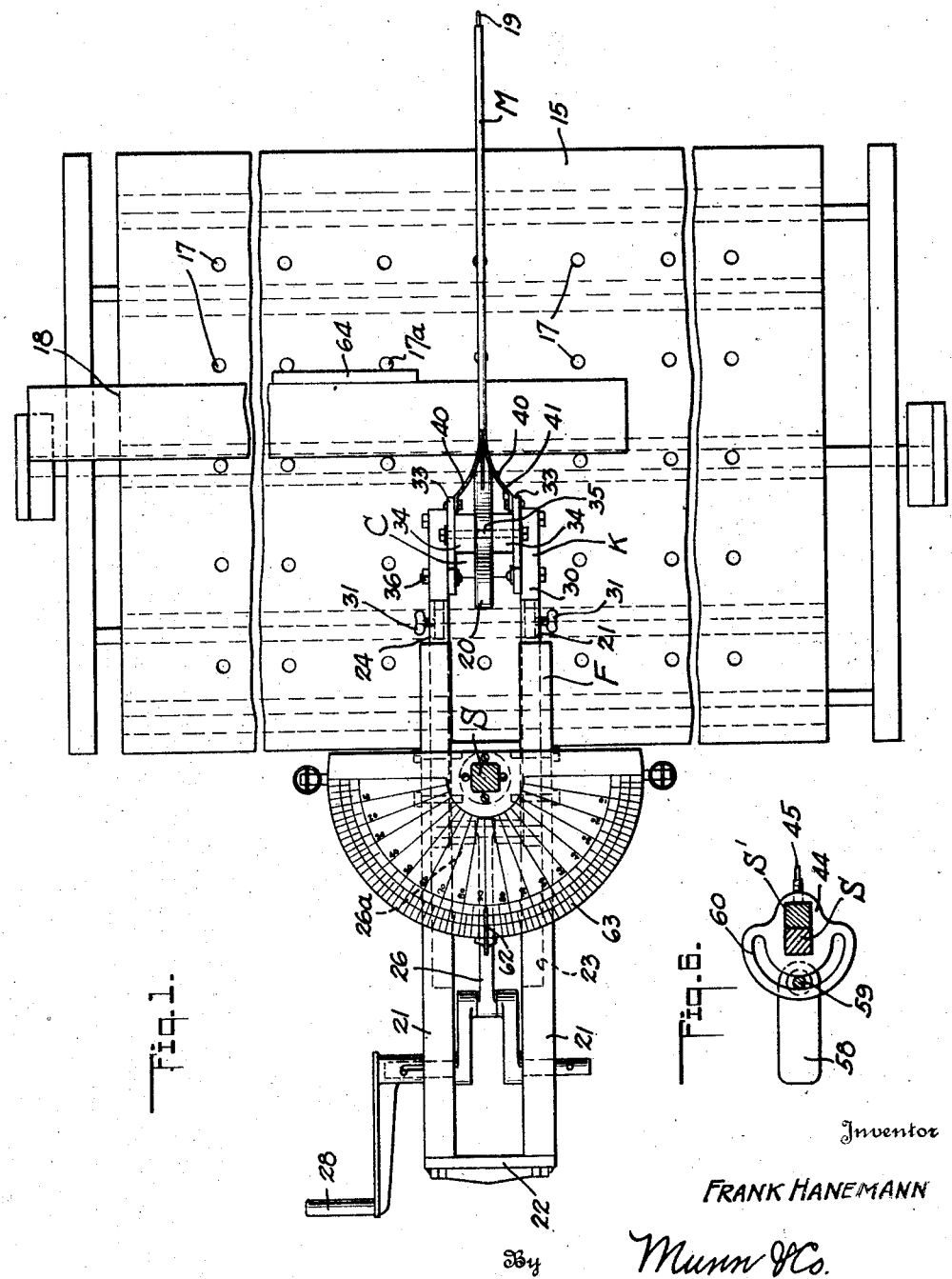

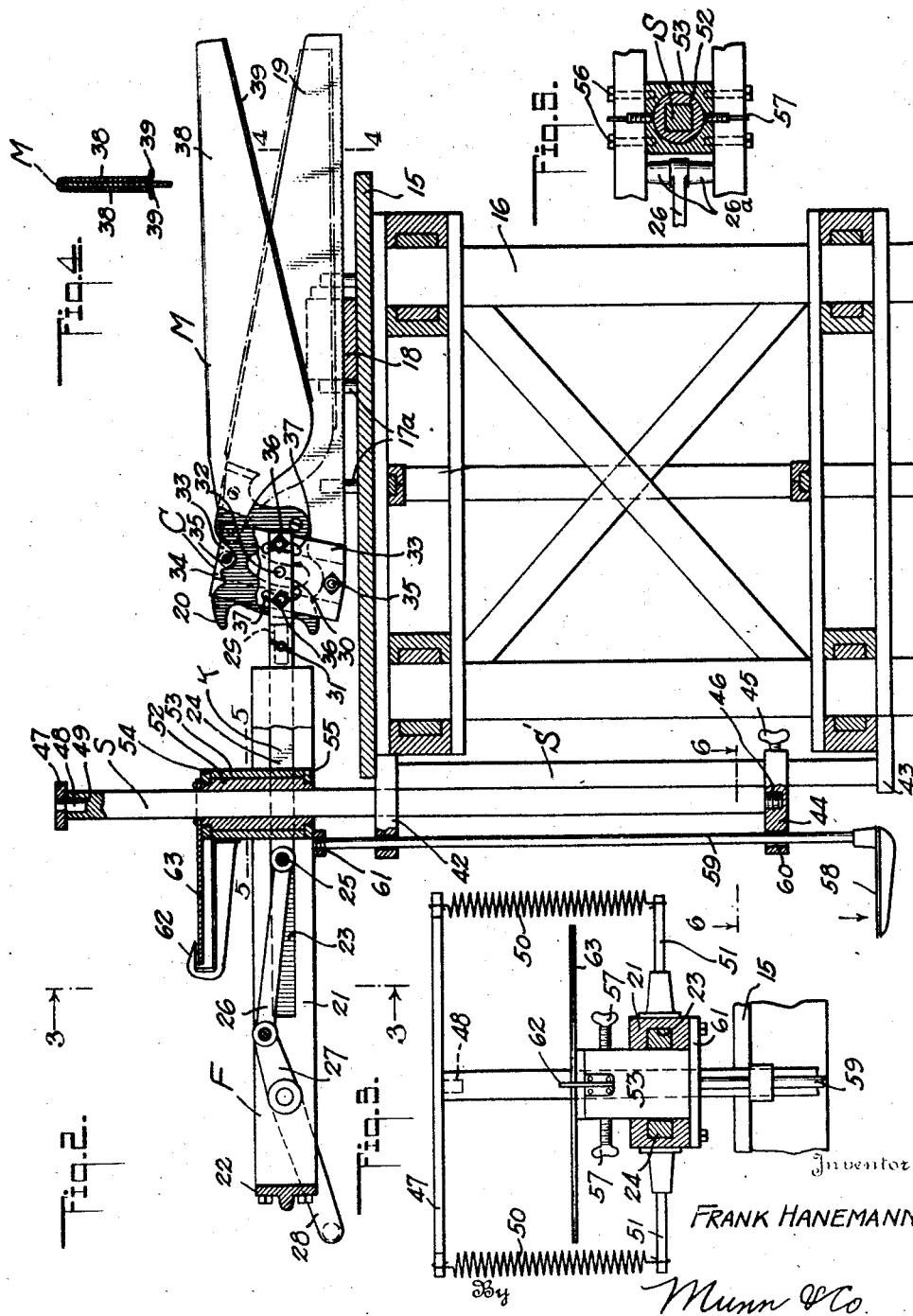

1,582,396

UNITED STATES PATENT OFFICE.

FRANK HANEMANN, OF LOS ANGELES, CALIFORNIA.

MITERING MACHINE.

Application filed April 5, 1924. Serial No. 704,481.

*To all whom it may concern:*

Be it known that I, FRANK HANEMANN, a citizen of the United States, and a resident of Los Angeles, in the county of Los Angeles and State of California, have invented certain new and useful Improvements in Mitering Machines, of which the following is a specification.

My invention relates to mitering machines of the reciprocating saw type, and a purpose of my invention is the provision of a mitering machine by means of which a conventional hand saw is supported for reciprocating movement in any vertical or horizontal plane, whereby true miter joints and bevel joints of any desired angle can be accurately cut.

It is also a purpose of my invention to provide a mitering machine having a hand or power operated mechanism for reciprocating the hand saw; clamping means for adjustably holding the saw at any desired elevation while being reciprocated; foot operated means for feeding the saw downwardly within the work, and means for bracing the blade of the hand saw against lateral bending during the entrance of the blade into a piece of work whereby an accurate cut is insured.

I will describe only one form of mitering machine, and will then point out the novel features thereof in claims.

In the accompanying drawings

Figure 1 is a view showing in top plan one form of mitering machine embodying my invention, with the standard thereof in horizontal section;

Figure 2 is a view showing in central vertical section the mitering machine shown in Figure 1;

Figures 3, 4, 5 and 6 are sectional views taken on the lines 3—3, 4—4, 5—5 and 6—6, respectively, of Figure 2.

Similar reference characters refer to similar parts in each of the several views.

Referring specifically to the drawings, my invention in its present embodiment comprises a work table including a top 15 supported in elevated position in a suitable framework 16 and provided with intersecting rows of openings 17 in which pegs 17ª are removably received. These pegs 17ª are designed for the purpose of holding a piece of work, indicated at 18, in any desired position upon the table for mitering or beveling by a saw, including a blade 19 and a handle 20. This saw is of conventional form and is adapted to be supported for reciprocating movement by means of a carriage designated generally at K, which is mounted for reciprocating movement within a frame designated generally at F. A clamp C is detachably associated with the carriage K and is adjustable to support the saw in any desired elevated or tilted position, depending upon the dimensions of the work to be cut.

The frame F in the present instance is of U-form and includes parallel bars 21 connected at one end by a cross bar 22, the confronting sides of the bars 21 being formed with grooves 23 in which are slidably mounted a pair of arms 24 constituting the carriage K. The arms 24 are rigidly connected by a cross pin 25 upon which is pivoted a connecting rod 26 held in definite position on the pin by spacing sleeves 26ª (Figure 1). The connecting rod 26 serves to operatively connect the carriage K to a crank shaft 27, the connecting rod and shaft constituting the mechanism for effecting reciprocating movement of the carriage and the hand saw. The crank shaft 27 is journaled in the parallel portions 21 and is adapted to be rotated by a motor (not shown) or by hand through the medium of a crank 28 which may be applied to either end of the crank shaft, as illustrated in Figure 1.

The forward ends of the arms 24 of the carriage K are provided with sockets for the reception of extensions 29 formed on bars 30 and secured within the sockets by means of set screws 31. These bars 30 are connected by a rod or pin 32 upon which plates 33 constituting a part of the clamp C are rotatably mounted to allow adjustment thereof in supporting the hand saw in horizontal or tilted position. The clamp C also includes blocks 34 arranged between the plates and embracing the opposite sides of the saw handle 20. Bolts 35 extend through the plates and blocks for securing the latter in clamping relation to the saw handle. The plates 33 can be secured in any adjusted position by bolts 36 extending through arcuate slots 37 formed in the plates, and with the blocks securely embracing the saw handle it will be clear that by an adjustment of the plates the saw as a unit can be moved upwardly or downwardly from horizontal position to occupy any desired tilted position.

For the purpose of bracing the saw blade 19, that is to say, maintaining the blade straight or in true linear form during the entrance of the saw blade into a piece of work, I have provided a member M formed of rigid metal or other suitable material and tapered in width to correspond to the shape of the blade of the saw. This member M is formed from a single sheet of material bent longitudinally to provide parallel portions 38 spaced apart sufficiently to loosely receive the saw blade 19. The lower edges of the portions 28 are formed with flanges 39 which are adapted to rest upon the piece of work and to prevent the passage of the member into the cut formed by the saw blade. This member M is provided with divergent portions 40 (Figure 1) which are pivoted upon the plates 32 by means of bolts 41. In this manner the member is supported for pivotal movement upon the saw so that normally its flanged edges 39 are disposed in close proximity and parallel to the cutting edge of the saw blade, as indicated in dot and dash lines in Figure 2. However, as the saw blade enters a piece of work, the member M remains in contact with the upper surface of the work, allowing the saw blade to pass downwardly out of the same, as illustrated in Figure 2.

The frame F is capable of vertical adjustment to vary the vertical position of the saw and horizontal adjustment to vary the angular position of the saw with respect to a piece of work, so that a true miter joint can be cut or a bevel joint of any desired angle. To this end, a standard S is provided and supported in upright position at one side of the work table by means of a bearing bracket 42 secured on the upper end of a subsidiary standard S', the latter in turn being supported by a base board 43 secured to the framework 16. A bearing bracket 44 is adjustable on the subsidiary standard S' and may be locked in any adjusted position by a thumb screw 45. The standard S is provided at its lower end with a screw threaded extension 46 which engages within a socket formed in the bearing bracket 44. From this arrangement it will be seen that the standard S is supported on the bearing bracket 44 and that by vertical adjustment of the latter upon the subsidiary standard the vertical position of the main standard S can be varied. This standard S is square in cross section and is provided at its upper end with a cross arm 47 rotatably mounted on the standard by a pin 48 rotatably fitted in a socket 49 formed in the standard. Connected to the ends of the cross arm 47 are the upper ends of contractile springs 50, the lower ends of the latter being connected to rods 51 extending laterally from and rigidly secured to the parallel portions 21 of the frame F, as clearly shown in Figure 3. These springs 50 serve to normally urge the frame F, together with the carriage K and the hand saw, upwardly upon the standard S so that normally the hand saw is maintained in an elevated position and out of contact with any work on the table 15.

The frame F is mounted for vertical and horizontal adjustments on the standard S through the medium of a sleeve 52 having a square bore to loosely receive the standard S, as clearly shown in Figure 5, whereby the sleeve can be moved vertically on the standard but not rotated thereon. A second sleeve 53 is provided with a rounded bore so as to rotate on the sleeve 52, and this sleeve 53 is supported on the first sleeve by collars 54 and 55 threadedly engaging the reduced ends of the sleeve 53, as clearly shown in Figure 2. The sleeve 53 in turn is secured to and between the parallel portions 21 of the frame F by means of fastening members 56, as clearly shown in Figure 5. The sleeve 53 can be locked to the sleeve 52 by means of set screws 57 so as to prevent horizontal movement of the frame F about the standard S.

The frame F, together with the carriage K and the hand saw, can be lowered against the action of the springs 50 by means of a pedal 58 secured to the lower end of a rod 59 slidably mounted in the bearing brackets 42 and 44, such brackets being formed with arcuate slots 60 (Figure 6) to allow horizontal movement of the rod and pedal when horizontally adjusting the frame F. The upper end of the rod 59 is threaded in a cross bar 61 secured to the frame F, so that by exerting downward pressure on the pedal 58 the entire frame and saw can be lowered to any desired position. It will be understood that as soon as the pedal is relieved of downward pressure the springs function to return the frame and saw to elevated position.

The rotatable mounting of the frame F on the standard allows the lateral adjustment of the frame to position the saw in any angular relation to the piece of work on the table 15, and for the purpose of determining the exact angular adjustment of the saw I have provided an indicating hand 62 secured to the outer sleeve 53 and overlying a dial 63 which, as shown in Figure 1, is graduated in degrees of ten.

In operation, the piece of work 18 is placed upon the table top 15 and held in proper position by means of the pegs 17ª. If the piece of work is narrower than the distance between any two adjacent rows of pegs, a filler board 64 can be placed between the work and the pegs to hold the former preparatory to the cutting operation. The saw blade may now be adjusted to the proper angle with respect to the work 18 by rotating the frame F, the hand 62 on the dial 63 serving to accurately determine the exact angle of the saw. The adjustment having been obtained, the frame F is locked in such position by a manipulation of the thumb screws 57. With the saw in elevated position it may now be lowered into contact with the work 18 by depressing the pedal 58, and by rotating the crank shaft 27 reciprocation of the saw is now effected. As the saw moves across the work the member M braces the cutting edge of the saw to insure a straight cut, as has been previously described, and as the saw moves downwardly within the work downward pressure can be exerted upon the saw by exerting downward pressure upon the pedal 58. After the work has been cut, the saw is returned to elevated position by relieving the pedal 58 of downward pressure to allow the springs to elevate the frame F, as has been described.

Should the saw in its normal elevated position be of insufficient height to permit the application of a relatively thick piece of work to the table 15, it will be clear that the standard S can be elevated from its present adjustment to elevate the normal position of the saw. Conversely, the standard S can be lowered to provide a proper adjustment and mounting for the saw when cutting relatively thin pieces of work.

Although I have herein shown and described only one form of mitering machine embodying my invention, it is to be understood that various changes and modifications may be made herein without departing from the spirit of the invention and the spirit and scope of the appended claims.

What I claim is:

1. A mitering machine comprising a vertically adjustable standard, a cross arm rotatable on the standard, a frame mounted for vertical adjustment on the standard and rotatable thereon irrespective of its vertical adjustment, contractile springs connecting the cross arm to the frame for urging the latter upwardly to a definite position on the standard, means for moving the frame downwardly on the standard against the action of said springs, a saw carriage mounted for reciprocating movement on the frame and adjustable therewith, and mechanism on the frame for reciprocating the saw carriage.

2. A mitering machine comprising a standard of angular cross section, means for vertically adjusting the standard, a sleeve slidable on the standard but locked against rotation thereon, a second sleeve rotatable on the first sleeve, releasable means for locking the second sleeve against rotation on the first sleeve, a dial carried by the first sleeve, an indicating hand carried by the second sleeve and movable over said dial, a frame secured to the second sleeve, arms mounted for reciprocating movement within the frame, a saw clamp carried by the arms, means for reciprocating the arms to effect a corresponding movement of the saw clamp, means for urging the frame and sleeves upwardly on the standard, and means for moving the frame and sleeves downwardly on the standard against the action of said urging means.

3. A mitering machine comprising a standard of angular cross section, means for vertically adjusting the standard, a sleeve slidable on the standard but locked against rotation thereon, a second sleeve rotatable on the first sleeve, releasable means for locking the second sleeve against rotation on the first sleeve, a dial carried by the first sleeve, an indicating hand carried by the second sleeve and movable over said dial, a frame secured to the second sleeve, arms mounted for reciprocating movement within the frame, a saw clamp carried by the arms, means for reciprocating the arms to effect a corresponding movement of the saw clamp, a cross bar secured to the upper end of the standard, arms secured to and extending laterally from the frame, means connecting the cross bar and arms for urging the frame, together with the sleeves, upwardly on the standard, a rod secured to and depending from the frame, slotted guide members for the rod, and a pedal on the rod for the purpose described.

4. A mitering machine comprising a vertically adjustable standard, a cross arm rotatable on the standard, a frame mounted for vertical adjustment on the standard and rotatable thereon irrespective of its vertical adjustment, resilient means connecting the cross arm to the frame for urging the latter upwardly to a definite position on the standard, means for moving the frame downwardly on the standard against the action of said resilient means, a saw carriage mounted for reciprocating movement on the frame and adjustable therewith, and mechanism on the frame for reciprocating the saw carriage.

5. A mitering machine comprising a standard of angular cross section, means for vertically adjusting the standard, a sleeve slidable against the standard but locked against rotation thereon, a second sleeve rotatable on the first sleeve, releasable means for locking the second sleeve against rotation on the first sleeve, coacting means on the sleeves for indicating the position of the second sleeve with respect to the first sleeve, a frame secured to the second sleeve, arms mounted for reciprocating movement within the frame, a saw clamp carried by the arms, means for reciprocating the arms to effect a corresponding movement of the saw clamp, means for urging the frame and sleeves upwardly on the standard, and means for moving the frame and sleeves downwardly on the standard against the action of said urging means.

6. A mitering machine comprising a standard of angular cross section, means for vertically adjusting the standard, a sleeve slidable on the standard but locked against rotation thereon, a second sleeve rotatable on the first sleeve, releasable means for locking the second sleeve against rotation on the first sleeve, coacting means on the sleeves for indicating the position of the second sleeve with respect to the first sleeve, a frame secured to the second sleeve, arms mounted for reciprocating movement within the frame, a saw clamp carried by the arms, means for reciprocating the arms to effect a corresponding movement of the saw clamp, a cross bar secured to the upper end of the standard, means secured to and extending laterally from the frame, means connecting the cross bar and arms for urging the frame, together with the sleeves, upwardly on the standard, a rod secured to and depending from the frame, slotted guide members for the rod, and a pedal on the rod for the purpose described.

7. A mitering machine comprising a standard of angular cross section, means for vertically adjusting the standard, a sleeve slidable on the standard but locked against rotation thereon, a second sleeve rotatable on the first sleeve, releasable means for locking the second sleeve against rotation on the first sleeve, a frame secured to the second sleeve, means mounted for reciprocating movement within the frame, a saw clamp carried by the arms, means for reciprocating the arms to effect a corresponding movement of the saw clamp, means for urging the frame and sleeves upwardly on the standard, and means for moving the frame and sleeves downwardly on the standard against the action of said urging means.

8. A mitering machine comprising a stationary standard, a movable standard, a bracket adjustable on the stationary standard and fixed to the movable standard, a second bracket fixed to the stationary standard and slidably receiving the movable standard, a saw carriage angularly adjustable about the movable standard, means for yieldably urging the carriage upwardly on the movable standard, a rod fixed to the carriage and slidable through the brackets, and a pedal on the rod.

FRANK HANEMANN.